US012671956B2

(12) United States Patent
Lian

(10) Patent No.: US 12,671,956 B2
(45) Date of Patent: Jun. 30, 2026

(54) AUDIO PROCESSING METHOD, WIRELESS EARPHONE, AND COMPUTER-READABLE MEDIUM

(71) Applicant: GUANGDONG OPPO MOBILE TELECOMMUNICATIONS CORP., LTD., Dongguan (CN)

(72) Inventor: Tianfu Lian, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 345 days.

(21) Appl. No.: 18/382,881

(22) Filed: Oct. 23, 2023

(65) Prior Publication Data

US 2024/0056762 A1 Feb. 15, 2024

Related U.S. Application Data

(63) Continuation of application No. PCT/CN2022/081575, filed on Mar. 18, 2022.

(30) Foreign Application Priority Data

Apr. 26, 2021 (CN) ........................ 202110454299.8

(51) Int. Cl.
*H04S 7/00* (2006.01)
*H04R 5/033* (2006.01)

(52) U.S. Cl.
CPC ............ *H04S 7/304* (2013.01); *H04R 5/033* (2013.01); *H04S 7/306* (2013.01);
(Continued)

(58) Field of Classification Search
CPC ...... H04S 7/304; H04S 7/306; H04S 2400/11; H04S 2400/13; H04R 5/033; H04R 2420/07; H04R 1/1016; H04R 3/12
(Continued)

(56) References Cited

U.S. PATENT DOCUMENTS

| | | | | |
|---|---|---|---|---|
| 10,674,307 | B1 | 6/2020 | Robinson et al. | |
| 2006/0111044 | A1 | 5/2006 | Keller | |
| 2008/0137875 | A1* | 6/2008 | Zong | G10K 15/12 381/63 |
| 2013/0259237 | A1 | 10/2013 | Oesch et al. | |

(Continued)

FOREIGN PATENT DOCUMENTS

| | | | |
|---|---|---|---|
| CN | 102572676 | A | 7/2012 |
| CN | 107258091 | A | 10/2017 |

(Continued)

OTHER PUBLICATIONS

CNIPA, Notification to Grant Patent Right for Invention issued for CN Application No. 202110454299.8 mailed on Dec. 1, 2024.

(Continued)

*Primary Examiner* — Vivian C Chin
*Assistant Examiner* — Con P Tran
(74) *Attorney, Agent, or Firm* — Sheppard, Mullin, Richter & Hampton LLP

(57) ABSTRACT

An audio processing method, a wireless earphone, and a non-transitory computer-readable medium are provided. The method is performed by the wireless earphone. Based on a wireless signal transmitted from a sound source device, a spatial position parameter of the wireless earphone is determined, where the spatial position parameter is used to indicate a spatial position relationship between the wireless earphone and the sound source device. A target spatial audio parameter is determined by determining, based on the spatial position parameter, a spatial audio parameter of the wireless earphone. A to-be-played audio signal is determined, based on the target spatial audio parameter and an audio signal outputted by the sound source device.

18 Claims, 6 Drawing Sheets

(52) U.S. Cl.
CPC ....... *H04R 2420/07* (2013.01); *H04S 2400/11* (2013.01); *H04S 2400/13* (2013.01)

(58) Field of Classification Search
USPC ............ 381/303, 310, 361, 63, 98, 104, 119
See application file for complete search history.

(56) References Cited

U.S. PATENT DOCUMENTS

2016/0227338 A1* 8/2016 Oh .......................... H04S 3/008
2020/0103486 A1 4/2020 Knaappila

FOREIGN PATENT DOCUMENTS

CN 110972033 A 4/2020
CN 111385728 A 7/2020
CN 111654806 A 9/2020
CN 111818441 A 10/2020
EP 2584794 A1 4/2013
EP 2830043 A2 1/2015
EP 3373602 A1 9/2018
EP 3468228 A1 4/2019

OTHER PUBLICATIONS

WIPO, International Search Report for PCT Application No. PCT/CN2022/081575, Jun. 8, 2022.
EPO, Extended European Search Report for EP Application No. 22794398.2 mailed on Aug. 1, 2024.
CNIPA, First Office Action for CN Application No. 202110454299.8 mailed on Jun. 29, 2024.

* cited by examiner

AUDIO PROCESSING METHOD, WIRELESS EARPHONE, AND COMPUTER-READABLE MEDIUM

CROSS-REFERENCE TO RELATED APPLICATIONS

This application is a continuation of International Application No. PCT/CN2022/081575, filed on Mar. 18, 2022, which claims priority to Chinese patent application No. 202110454299.8, filed on Apr. 26, 2021, both of which are incorporated herein by reference in their entireties.

TECHNICAL FIELD

The disclosure relates to the field of earphones, and particularly to an audio processing method, an audio processing apparatus, a wireless earphone, and a computer-readable medium.

BACKGROUND

At present, when a user is wearing earphones, a combination of head tracking technology and spatial sound rendering technology enables the user to perceive a position and a distance of a sound source device, thereby achieving a better audio effect. However, the existing head tracking technology usually uses an image sensor or a motion sensor mounted at the head, which are ineffective.

SUMMARY

Embodiments of the disclosure provide an audio processing method, a wireless earphone, and a computer-readable medium.

In an aspect, the embodiments of the disclosure provide the audio processing method. The method performed by a wireless earphone. The method includes: determining, based on a wireless signal transmitted from a sound source device, a spatial position parameter of the wireless earphone, in which the spatial position parameter is used to indicate a spatial position relationship between the wireless earphone and the sound source device; obtaining a target spatial audio parameter, by determining, based on the spatial position parameter, a spatial audio parameter of the wireless earphone; and determining a to-be-played audio signal, based on the target spatial audio parameter and an audio signal outputted by the sound source device.

In another aspect, the embodiments of the disclosure further provide a wireless earphone. The wireless earphone includes an audio processing module, a loudspeaker, and a wireless communication module connected to the audio processing module. The wireless communication module is configured to obtain a wireless signal transmitted from a sound source device. The audio processing module is configured to determine a to-be-played audio signal based on the above method. In some implementations, the audio processing module comprises an audio regulator and a processor connected to the audio regulator. The processor is configured to: determine a spatial position parameter of the wireless earphone, based on the wireless signal that is transmitted from the sound source device and received by the wireless communication module; and obtain a target spatial audio parameter by determining, based on the spatial position parameter, a spatial audio parameter of the wireless earphone. The audio regulator is configured to determine a to-be-played audio signal, based on the target spatial audio parameter and the audio signal outputted by the sound source device.

In yet another aspect, the embodiments of the disclosure further provide a non-transitory computer-readable storage medium. The computer-readable storage medium stores thereon program codes executable by a processor. The program codes, when being executed by the processor, cause the processor to implement the above method. In some implementations, the method includes operations as follows. A spatial position parameter of the wireless earphone is determined, based on a wireless signal transmitted from a sound source device, where the spatial position parameter is used to indicate a spatial position relationship between the wireless earphone and the sound source device. A target spatial audio parameter of the wireless earphone is obtained, based on the spatial position parameter, where the target spatial audio parameter comprises at least one of a target gain parameter and a target delay duration. A to-be-played audio signal is determined, based on the target spatial audio parameter and an audio signal outputted by the sound source device.

Other features and aspects of the disclosed features will become apparent from the following detailed description, taken in conjunction with the accompanying drawings, which illustrate, by way of example, the features in accordance with embodiments of the disclosure. The summary is not intended to limit the scope of any embodiments described herein.

BRIEF DESCRIPTION OF THE DRAWINGS

In order to more clearly illustrate technical solutions in the embodiments of the present disclosure, drawings to be used in the embodiments are briefly described below. Apparently, the following drawings are merely some embodiments of the present disclosure, and those skilled in the art can obtain other drawings according to these figures without paying any creative effort.

DETAILED DESCRIPTION OF PREFERRED EMBODIMENTS

Figure 1:
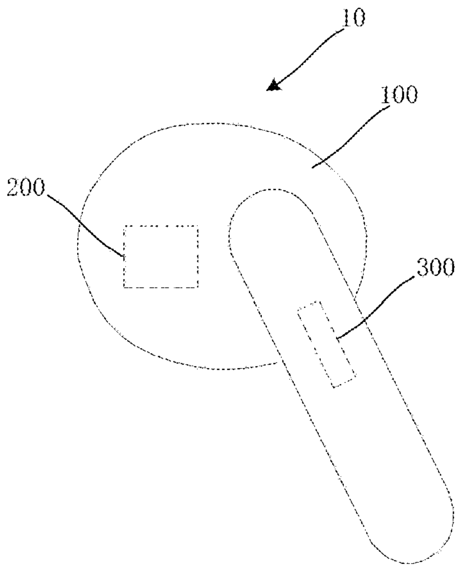
FIG. 1 is a structural diagram of a wireless earphone according to some embodiments of the disclosure.

In order to make those skilled in the art better understand the technical schemes of the disclosure, the technical schemes in the embodiments of the disclosure will be described clearly and comprehensively with reference to the drawings in the embodiments of the disclosure.

At present, when a user is wearing earphones, a combination of head tracking technology and spatial sound rendering technology enables the user to perceive a position and a distance of a sound source device, thereby achieving a better audio effect.

For example, head tracking is achieved through an image sensor, and a pre-created head related transfer functions (HRTF) database and a filter are used to filter a 3D audio source, so as to realize realistic audio rendering. For another example, a head tracking device (e.g., a digital gyroscope) is provided on earphones. A head tracking angle may be determined based on sensor data obtained from the digital gyroscope mounted in the headphones. Then, the pre-created HRTF is selected to implement a binaural spatial acoustic filter, so as to render a stable stereophonic image.

However, the inventor has found in research that the existing head tracking technology usually uses an image sensor or a motion sensor mounted at the head, which is ineffective. Specifically, for the technology in which a camera of an electronic device is used to capture images of an environmental scene and information on head position and posture is obtained, a power consumption of the electronic device is increased and an endurance time is decreased. In addition, the accuracy of recognizing an orientation to which the head rotates is affected by an image recognition algorithm and a camera resolution. Furthermore, it is not feasible to calculate a distance between an audio/video device and the user wearing the earphones, only based on the combination of the camera with an orientation recognition algorithm. These factors lead to poor effect of rendering spatial acoustics, which affects the user experience.

In addition, for the head tracking method using the motion sensors, the motion sensors mainly include an accelerometer, a gyroscope and a magnetic sensor, etc. Such motion sensors have inherent shortcomings in motion tracking and angular orientation. For example, the accelerometer provides a gravity vector and the magnetic sensor is a compass, the information output from these two sensors may be used to calculate an orientation of the device. However, the outputs of these two sensors are inaccurate and contain a lot of noises. The gyroscope provides an angular velocity of rotation in three axes, which is accurate and sensitive. However, the gyroscope may generate a drift error over a long duration of time, this is because that the angular velocity needs to be integrated to obtain orientation information, but the integration process leads to a minor numerical error, and accumulation of such error over a long duration of time results in a significant drift.

Furthermore, in the case where a user is wearing the earphones and using a virtual surround sound to listen to music, when the user's head rotates, the virtual surround sound in the earphones would follow the head to rotate, resulting in a user's feeling different from listening to live music. The virtual surround sound cannot enable the user to perceive the distance between the user and the audio/video playback device, and the spatial sound rendering is not real enough.

Therefore, in order to overcome the above deficiencies, the embodiments of the disclosure provide an audio processing method, an audio processing apparatus, a wireless earphone, and a computer-readable medium, in which a spatial position relationship between a wireless earphone and a sound source device can be determined based on a wireless signal therebetween. Compared with the schemes of using the image sensor and the motion sensor, no additional hardware needs to be installed in the wireless earphone, i.e., the cost of the wireless earphone is not increased; in addition, the determined spatial position is more accurate.

Specifically, for describing method embodiments of the disclosure, the wireless earphone provided by the embodiments of the disclosure is first described. The wireless earphone can determine a spatial position parameter between the wireless earphone and the sound source device, and can realize spatial acoustic rendering. In this way, the wireless earphone, when being worn by a user, can provide variations in a sound with different spatial positions such as different angles and distances relative to the sound source device.

Referring to FIG. 1, FIG. 1 illustrates a wireless earphone 10 according to some embodiments of the disclosure. The wireless earphone 10 includes a housing 100, as well as an audio circuit 200 and a wireless communication module 300 that are disposed in the housing 100. In some implementations, the audio circuit 200 and the wireless communication module 300 are provided inside the housing 100. The audio circuit 200 is used to make a sound based on to-be-played audio data, so as to play the audio data. The wireless communication module 300 is used to establish a wireless communication link between the wireless earphone and other electronic devices supporting wireless communication, so as to enable the wireless earphone to interact data with the other electronic devices through the wireless communication link. In some implementations, the electronic device may be a device capable of running an audio-based application and playing audio, such as a smartphone, a tablet computer, or an e-book reader.

Figure 2:
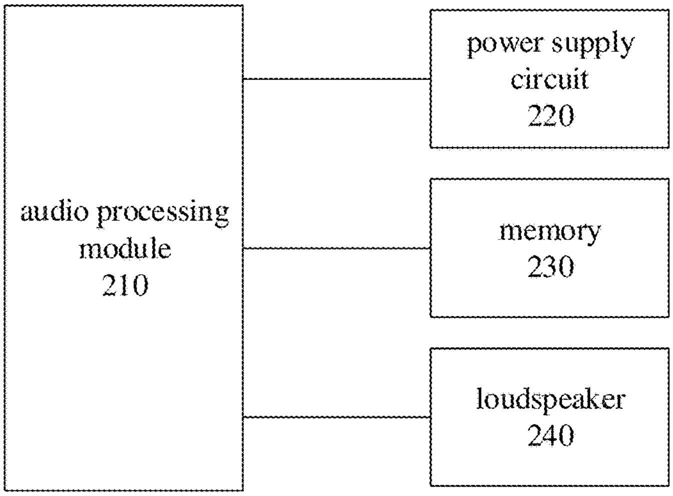
FIG. 2 is a schematic diagram of an audio circuit of the wireless earphone according to some embodiments of the disclosure.

In some implementations, referring to FIG. 2, the audio circuit 200 includes an audio processing module 210, a memory 230, a loudspeaker 240, and a power supply circuit 220, and the memory 230, the loudspeaker 240, and the power supply circuit 220 each are connected to the audio processing module 210.

In some implementations, the audio processing module 210 is used to set an audio parameter, and to control the loudspeaker 240 to play audio. The audio parameter is a parameter for playing the audio data, for example, the audio parameter may include a volume level and a sound effect parameter. Specifically, the audio parameter may include multiple sub-parameters. Each sub-parameter corresponds to a component of a to-be-played audio signal, and each sub-parameter corresponds to a sound generation module. Each sound generation module is used to generate a sound signal, based on the audio signal and the sub-parameter corresponding to this sound generation module. The sound signals generated by individual sound generation modules are used as the to-be-played audio signal.

In some embodiments, the to-be-played audio signal is composed of a direct sound, a reflected sound, and a reverberation sound, and the audio processing module 210 may include a direct sound module, a reflected sound module, and a reverberation sound module. Specifically, the direct sound module is used to output the direct sound based on an audio parameter of direct sound; the reflected sound module is used to output the reflected sound based on an audio parameter of reflected sound; and the reverberation sound module is used to output reverberation sound based on an audio parameter of reverberation sound. The direct sound, the reflected sound, and the reverberation sound consist of the to-be-played audio signal. The audio processing module 210 may be a program module in the wireless earphone, and various functions of the audio processing module 210 may be realized by the program module. For example, the audio processing module may be a collection of programs in the memory of the wireless earphone, and the collection of programs can be called by the processor of the wireless earphone to realize the functions of the audio processing module, i.e., the functions of the method embodiments of the disclosure.

In some other embodiments, the audio processing module 210 may be a hardware module in the wireless earphone, and a hardware circuit may be used to realize the various functions of the audio processing module 210. For example, the direct sound module, the reflected sound module, the reverberation sound module as well as other following components may be hardware circuits. The audio processing module includes an audio regulator and a processor connected to the audio regulator. The processor is used to: determine a spatial position parameter of the wireless earphone, based on a wireless signal that is sent from the sound source device and received by the wireless communication module; and obtain a target spatial audio parameter by determining, based on the spatial position parameter, a spatial audio parameter of the wireless earphone. The audio regulator is used to determine a to-be-played audio signal, based on the target spatial audio parameter and an audio signal outputted by the sound source device.

Figure 3:
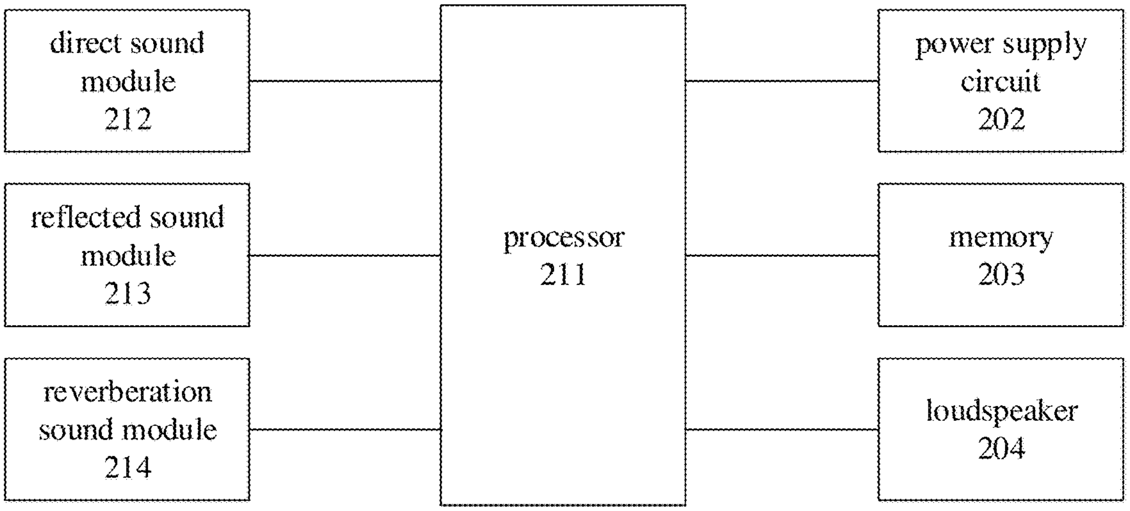
FIG. 3 is a schematic diagram of an audio processing module of the wireless earphone according to some embodiments of the disclosure.

Specifically, referring to FIG. 3, the audio processing module 210 includes the processor 211, the direct sound module 212, the reflected sound module 213, and the reverberation sound module 214. The direct sound module 212, the reflected sound module 213, and the reverberation sound module 214 each are connected to the processor 211. The processor 211 is used to input the audio parameter of direct sound to the direct sound module 212, input the audio parameter of reflected sound to the reflected sound module 213, and input the audio parameter of reverberant sound to the reverberant sound module 214. The direct sound module 212 is used to output the direct sound based on the audio parameter of direct sound. The reflected sound module 213 is used to output the reflected sound based on the audio parameter of reflected sound. The reverberation sound module 214 is used to output reverberation sound based on the audio parameter of reverberation sound.

In some implementations, one or more programs may be stored in the memory 203 and configured to be executed by the one or more processors 211. The one or more programs are configured to perform the method described in the embodiments of the disclosure, and specific implementations of the method refer to the following embodiments.

The processor 211 may include one or more processing cores. The processor 211 may be connected to various parts of the entire electronic device by using various interfaces and lines, and execute various functions of the electronic device and process data, by running or executing instructions, programs, code sets, or instruction sets stored in the memory 203, and calling data stored in the memory 203. In some implementations, the processor 211 may be implemented in at least one hardware of a digital signal processing (DSP), a field-programmable gate array (FPGA), and a programmable logic array (PLA). The processor 120 may integrate one or more of a central processing unit (CPU), a graphics processing unit (GPU), and a modem. The CPU mainly handles an operating system, a user interface, an application, or the like. The GPU is configured to render and draw the content to be displayed. The modem is configured to handle wireless communication. It can be understood that the modem may also not be integrated into the processor 211, and may be realized by a single chip.

The memory 203 may include a random-access memory (RAM), and may also include a read-only memory (ROM). The memory 203 may be configured to store instructions, programs, codes, code sets, or instruction sets. The memory 203 may include a program storage area and a data storage area. The program storage area may store instructions for implementing the operating system, instructions for realizing at least one function (such as a touch control function, a voice playing function, and an image playing function), instructions for implementing the following method embodiments, etc. The data storage area may also store data (e.g., phone book, audio/video data, chat log data) and the like created by the electronic device in service.

Figure 4:
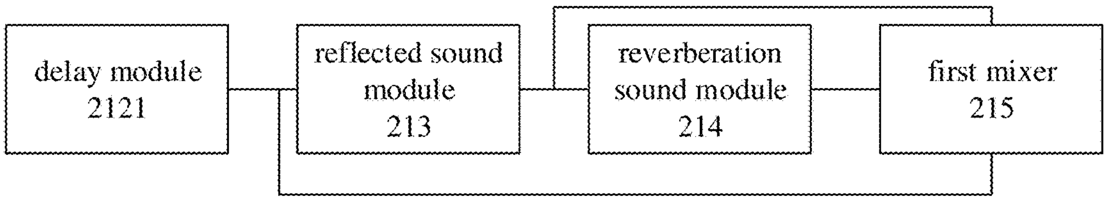
FIG. 4 is another schematic diagram of the audio processing module of the wireless earphone according to some embodiments of the disclosure.

In some implementations, referring to FIG. 4, the audio processing module 210 further includes a first mixer 215, and the direct sound module 212 includes a delay module 2121. The delay module 2121 is connected to each of an input of the reflected sound module 213 and a first input of the first mixer 215. An output of the reflected sound module 213 is connected to each of an input of the reverberation sound module 214 and a second input of the first mixer 215. An output of the reverberation sound module 214 is connected to a third input of the first mixer 215.

The delay module 2121 is used to delay, based on the audio parameter of direct sound, the audio signal to obtain the direct sound signal, so as to simulate the direct sound and the difference between the binaural direct sounds for different distances. The reflected sound module 213 is used to perform, based on the audio parameter of reflected sound, volume adjustment and delay processing on components of the direct sound signal in a whole frequency band range, so as to obtain the reflected sound signal. The reverberation sound module 214 is used to perform, based on the audio parameter of reverberation sound, volume adjustment and delay processing on a component at a specified frequency band of the reflected sound signal, so as to obtain the reverberant sound signal. The first mixer 215 is used to mix the direct sound signal, the reflected sound signal and the reverberation sound signal, thereby outputting a mixed spatial audio signal.

Figure 5:
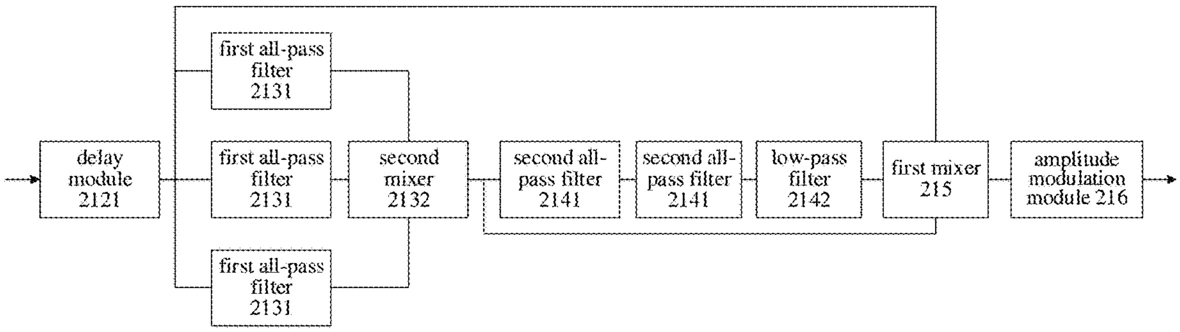
FIG. 5 is yet another schematic diagram of the audio processing module of the wireless earphone according to some embodiments of the disclosure.

Referring to FIG. 5, the reflected sound module 213 includes a first filter bank and a second mixer 2132. The first filter bank includes N first all-pass filters 2131 connected in parallel, and each first all-pass filter 2131 is connected to one input of the second mixer 2132. An output of the second mixer 2132 is connected to each of the input of the reverberation sound module 214 and a second input of the first mixer 215. N is a positive integer. The first filter bank is connected to the delay module 2121. The first all-pass filter 2131 can perform operations such as gain adjustment and delay on the input signal, so as to simulate the reflected sound obtained by reflecting the signal output from the sound source device. A density of the reflected sound may be increased by means of the multiple first all-pass filters 2131, that is, multiple reflected sounds reflected at different lengths and angles can be played. The direct sound output from the delay module 2121 undergoes operations such as volume adjustment and delay of the first all-pass filters 2131, to form reflected sounds. The reflected sounds output from the multiple first all-pass filters 2131 are mixed by the second mixer 2132.

Referring to FIG. 5, the reverberation sound module 214 includes a low-pass filter 2142 and a second filter bank. The second filter bank includes M second all-pass filters 2141 connected in series. The output of the reflected sound module 213 is connected to the input of the low-pass filter 2142 through the second filter bank, and an output of the low-pass filter 2142 is connected to a third input of the first mixer 215. M is a positive integer. In some implementations, the output of the second mixer 2132 is connected to the input of one second all-pass filter 2141, and the reflected sound output from the second mixer 2132 is fed into the second filter bank. The second all-pass filters 2141 of the second filter bank is used to form a reverberation sound, and the low-pass filter simulates the attenuation of a high-frequency signal in the air, i.e., the low-pass filter is used to reduce an amplitude of a high-frequency component of the sound signal. The delay and gain of each all-pass filter may be set as required. A delay value of the all-pass filter may be set to 200-2000 sample points under a sampling rate of 44100 Hz; and a gain range of the all-pass filter is $0<g<1$. The delay of the low-pass filter is generally 1 sample point, i.e., a first-order low-pass filter may satisfy the demand, and the gain range of the low-pass filter is $0<g<1$.

Referring to FIG. 5, the audio processing module 210 further includes an amplitude modulation module 216, an output of the first mixer 215 is connected to an input of the amplitude modulation module 216. An output of the amplitude modulation module 216 is connected to the loudspeaker, so as to input a sound signal into the loudspeaker for play.

In some implementations, there may be two wireless earphones, i.e., a first earphone and a second earphone. For example, the first earphone may be worn by the user in the left ear, and the second earphone may be worn by the user in the right ear. The first earphone and the second earphone both include the hardware structure described above. The respective processor can adjust audio parameters, i.e., the parameters of the various hardware mentioned above, of each of the first earphone and the second earphone, thereby realizing a rendering effect of binaural spatial sound. The delay module 2121 is configured to simulate time at each of the two ears, and the gain G is used to simulate a sound pressure at each of the two ears.

Specifically, a realization principle of the above wireless earphone refers to the following method embodiments.

Figure 6:
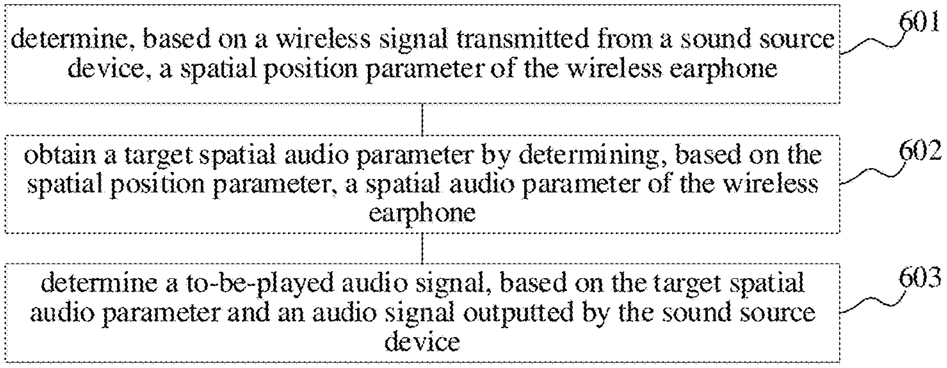
FIG. 6 is a schematic flowchart of an audio processing method according to some embodiments of the disclosure.

Referring to FIG. 6, FIG. 6 illustrates an audio processing method, which is applied to the above-described wireless earphone. In some implementations, the method may be executed by the above-described processor. Specifically, the method includes S601 to S603.

At S601, a spatial position parameter of the wireless earphone is determined, based on a wireless signal transmitted from a sound source device.

Figure 7:
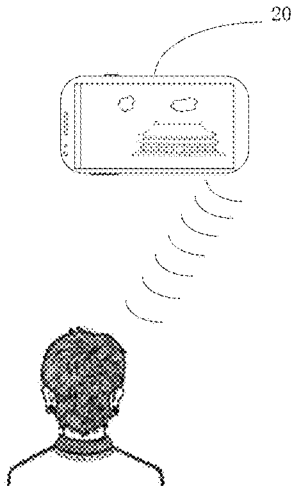
FIG. 7 is a schematic diagram illustrating a sound source device according to some embodiments of the disclosure.

The spatial position parameter is used to indicate a spatial position relationship between the wireless earphone and the sound source device. In some implementations, the sound source device may be an audio playback device. Referring to FIG. 7, the audio playback device may be a smartphone 20, and the smartphone 20 and the wireless earphone are connected to each other through a wireless communication link. The smartphone 20 can send an audio signal to the wireless earphone through the wireless communication link The wireless earphone plays the audio signal, and the user listens to the audio signal through the wireless earphone.

In some other implementations, the sound source device may be a virtual audio playback device. Specifically, a location point is set within a world coordinate system, and it is assumed that an audio playback device is set at the location point. In fact, there is no physical audio playback device at the location point, but an audio playback device is assumed to be set at the location point. When a user is wearing the earphone, the user can perceive, through the method of the disclosure, that the sound source device corresponding to the heard sound is located at the location point. For example, in a virtual reality scene, the real world coordinate system is established based on a location point of a user, and another location point in the world coordinate system is determined as the location point for the sound source device. Since there is a mapping relationship between the virtual world coordinate system and the real world coordinate system in the virtual reality, the position of the sound source device in the virtual world coordinate system may be determined, based on the location point of the sound source device and the mapping relationship between the virtual world coordinate system and the real world coordinate system. As such, the user can perceive the position of the sound source device in a virtual reality environment. In such implementation, a localization device may be provided at the location point of the sound source device. The localization device may include a wireless communication device, and the wireless earphone may be connected to the wireless communication device of the localization device through the wireless communication device in the wireless earphone, so as to establish the wireless communication link between the wireless earphone and the localization device.

It is notable that, when the sound source device is the audio playback device, the wireless signal, which is transmitted from the sound source device and acquired through the wireless communication link between the wireless earphone and the sound source device, may be an audio signal or a wireless localization signal. When the wireless signal is an audio signal, the sound played by the wireless earphone later is the audio signal. Referring to FIG. 7, when the user is wearing the earphone and watching a video played by the smartphone 20, the smartphone 20 transmits, through the wireless communication link between the smartphone 20 and the wireless earphone, an audio signal corresponding to the video to the wireless earphone, so that the user wearing the wireless earphone can hear an audio content corresponding to the video. The audio signal is not only used as the audio content that is to be played by the wireless earphone, but can be further used to determine the spatial position parameter of the wireless earphone relative to the sound source device. When the wireless signal is a wireless localization signal, the wireless localization signal may be a wireless signal in any form, and it is not limited to an audio signal.

In some implementations, the spatial position parameter may include at least one of a distance parameter and an angle of arrival. A strength of the wireless signal reaching the wireless earphone from the sound source device is correlated with a distance between the wireless earphone and the sound source device. For example, the greater the distance, the less the strength of the wireless signal. The angle of arrival may be determined based on the distance and a phase difference between wireless signals transmitted by different wireless communication devices (e.g., antennas). A specific manner of obtaining the angle of arrival may be referred to the following embodiments.

In some implementations, the wireless communication device of the wireless earphone may be a Bluetooth device, and the wireless communication link between the wireless earphone and the sound source device is a Bluetooth communication link Of course, the wireless communication device may alternatively be a Wi-Fi or other devices capable of transmitting a wireless signal.

At S602, a spatial audio parameter of the wireless earphone is determined based on the spatial position parameter, and a target spatial audio parameter is obtained.

In some implementations, the spatial audio parameter includes a gain parameter and a delay duration. The gain parameter is used to affect a playback volume in playing audio content by the wireless earphone, i.e., the wireless earphone controls, based on the gain parameter, the playback volume when playing the audio content. In some implementations, the gain parameter may be a volume level. A certain number of volume levels are pre-set, e.g., level 1, level 2, level 3, level 4, in which the higher the level, the higher the volume. In some other implementations, the gain parameter may be a volume percentage, where the higher the volume percentage, the higher the volume. The volume percentage represents a percentage of a maximum volume, e.g., 80% indicating 80% of a maximum volume level. In yet other implementations, the gain parameter may be a sound pressure level, where the higher the sound pressure level, the higher the volume.

The delay duration is used to affect a playback time at which the audio content is played by the wireless earphone, that is, the wireless earphone determines, based on the delay duration, a waiting time during which the wireless earphone wait for the playback, so that the wireless earphone is controlled to play the audio content after waiting the delay duration. Different delay durations correspond to different playback times for playing the audio content, where the higher the delay duration, the later the playback time.

In some implementations, the spatial position parameter can indicate distance and angle relationships between the wireless earphone and the sound source device, and the distance and angle relationships may affect the volume and the playback time for the wireless earphone to play the audio. For example, the further away the user is from the sound source device, the smaller the sound the user hears and the later the playback time is. In this way, by means of an adjustment strategy used in determining, based on the spatial position parameter, the spatial audio parameter of the wireless earphone, the user is enabled to listen to the audio content with an auditory effect of spatial sound that the sound transmitted from the sound source device reaches the human's ears after undergoes spatial attenuation and delay. Details of the adjustment refer to the following embodiments.

At S603, a to-be-played audio signal is determined, based on the target spatial audio parameter and an audio signal outputted by the sound source device.

In some implementations, when the sound source device is the audio playback device, the to-be-played audio signal may be from the audio signal transmitted from the aforementioned sound source device. When the sound source device is a localization device, the to-be-played audio signal may be pre-stored audio data in the wireless earphone or audio data transmitted to the wireless earphone from other electronic devices. For example, in a virtual reality scenario where a user wears a head-mounted display device including a wireless earphone and the head-mounted display device is externally connected to a terminal or internally provided with a video rendering device, the head-mounted display device may have the audio data stored thereon or acquire the audio data from the terminal. The localization device is provided in the real environment corresponding to the virtual reality. The wireless earphone adjusts the spatial audio parameter based on the spatial position relationship between the wireless earphone and the localization device, and adjusts, based on the adjusted spatial audio parameter, the audio signal to obtain to-be-played audio data, which is taken as the to-be-played audio signal. In this way, a spatial sound can reach the user's ear and be heard by the ear, in which the spatial sound stimulates a sound that is transmitted from the position of the localization device and reaches the user's ear after undergoing operations, such as spatial attenuation, reflection, and reverberation.

Therefore, the spatial position parameter of the wireless earphone is determined based on the spatial position parameter, so that when the wireless earphone plays an audio signal, audio characteristics of the played audio signal can be correlated with the spatial position relationship between the wireless earphone and the sound source device, thereby realizing the rendering effect of spatial sound. Moreover, in the embodiments of the disclosure, the spatial position relationship between the wireless earphone and the sound source device is determined based on the wireless signal between the wireless earphone and the sound source device. Compared with the schemes of using the image sensor and the motion sensor, no additional hardware device needs to be installed in the wireless earphone, i.e., the cost of the wireless earphone is not increased; in addition, the determined spatial position is more accurate.

Figure 8:
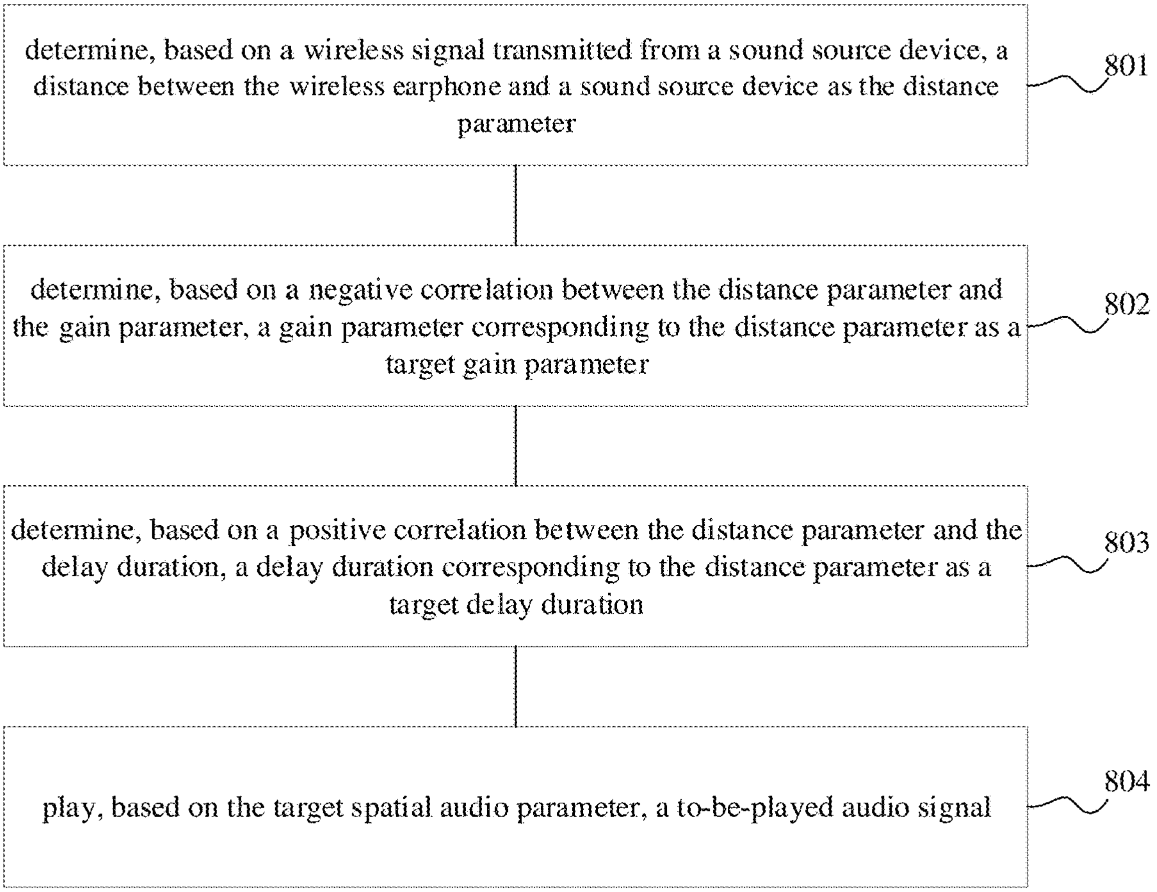
FIG. 8 is another schematic flowchart of the audio processing method according to some embodiments of the disclosure.

Referring to FIG. 8, FIG. 8 illustrates an audio processing method, in which the spatial position parameter includes a distance parameter, and the spatial audio parameter includes a gain parameter and a delay duration. In some implementations, the method may be executed by the processor as described above. Specifically, the method includes S801 to S804.

At S801, a distance between the wireless earphone and a sound source device is determined as the distance parameter, based on a wireless signal transmitted from the sound source device.

In some implementations, a signal strength of the wireless signal is acquired, and based on the signal strength, the distance between the wireless earphone and the sound source device is determined as the distance parameter. The distance parameter may be a distance value. The higher the signal strength, the smaller the distance between the wireless earphone and the sound source device; and the lower the signal strength, the larger the distance between the wireless earphone and the sound source device. In other words, the signal strength is negatively correlated with the distance.

In some implementations, in a multi-point localization algorithm based on a received signal strength indication (RSSI) value, a distance between a transmitting end and a receiving end of a Bluetooth signal is calculated with a mathematical relationship, and based on a processed RSSI value, and a signal attenuation model. Thus, the strength of the signal is converted into a measurement of the distance. Specifically, the distance parameter is obtained according to the following equation:

$$d = 10^{\frac{\text{abs}(RSSI) - A}{10 \times n}} \tag{1}$$

where d represents the value of the distance between the wireless earphone and the sound source device, and it is measured in meters; RSSI represents a received signal strength of the wireless signal, abs (RSSI) represents an absolute value of RSSI, A represents the received signal strength of the receiving end when the Bluetooth transmitting end is spaced 1 meter apart from the receiving end, and n represents an environmental attenuation factor. A and n are obtained through repeated tests and comparison with an actual distance. The distance between the sound source device and the wireless earphone (i.e., the human ear) can be obtained according to equation (1), and the distance can be used for processing such as delay and volume adjustment for the spatial sound rendering.

At S802, based on a negative correlation between the distance parameter and the gain parameter, a gain parameter corresponding to the distance parameter is determined as a target gain parameter.

The negative correlation between the distance parameter and the gain parameter means that the distance parameter is inversely proportional to the gain parameter. When the distance parameter is a distance value and the gain parameter is a volume value, the greater the distance value, the smaller the volume value; and the smaller the distance value, the greater the volume value.

In some implementations, first correspondences between distance parameters and gain parameters may be set in advance. In such first correspondence, there is a negative correlation between the distance parameter and the gain parameter. After the distance between the wireless earphone and the sound source device is determined as the distance parameter, the distance parameter is taken as the target distance parameter, and a gain parameter corresponding to the target distance parameter is looked up in the first correspondences, so as to obtain the target gain parameter.

In some other implementations, a distance-volume relationship equation may be set to determine the gain parameter. In such relationship equation, the greater the distance parameter, the smaller the gain parameter, i.e., the distance parameter is negatively correlated with the gain parameter. In some implementations, a change rule between the distance and the gain may be predetermined, in which the change rule includes a relationship between a change value of the distance and a change value of the gain, e.g., the gain is decreased by g each time the distance is increased by D. The gain parameter corresponding to a current distance parameter may be determined, based on the change rule.

A distance threshold may be set, so as to avoid an excessive volume when the distance is too close. When the distance parameter is less than the distance threshold, a gain parameter is first determined, based on the first correspondences or the above distance-volume relationship equation, as an initial gain parameter, and the initial gain parameter is then reduced by a first specified value to obtain the target gain parameter. When the distance parameter is greater than the distance threshold, the gain parameter determined based on the first correspondences or the above distance-volume relationship equation is taken as the target gain parameter. The distance threshold may be set based on experience. When the distance parameter is less than the distance threshold, it indicates that the distance between the wireless earphone and the sound source device is too close, and an auditory effect is provided that stimulates a situation where the sound source device would reduce the volume when the user is close to the sound source device, for example, when a distance between two users that are communicating decreases, the speaker would reduce his/her voice spontaneously. In addition, this can avoid a problem that the gain parameter is increased to be too large as the distance decreases in adjusting the gain parameter based on the distance, which problem would result in a poor user experience. The first specified value may be a value preset based on experience. In addition, in a case where the distance parameter is less than the distance threshold, the smaller the distance, the larger the first specified value, that is, the distance is negatively correlated with the first specified value.

In some implementations, the gain parameter may be a gain parameter of the amplitude modulation module in the audio processing circuit, and it may also include gain parameters of the various filters in the audio processing circuit. The gain parameter of the amplitude modulation module and the gain parameters of the all-pass filters can be used to adjust the volume of components of the audio signal in the whole frequency band range, and the gain parameter of the low-pass filter can adjust the volume of a high-frequency component of the audio signal. For example, the adjustment of the gain value of the low-pass filter may change a frequency response curve of the low-pass filter, so as to simulate a situation in which a high-frequency sound decays faster than a low-frequency sound in air, i.e., high-frequency attenuation damping.

In addition, the gains of the filters in the reflected sound module 213 and the reverberation sound module 214 are further used to realize an effect of the reflected sound and the reverberation sound respectively, details will be described in the following embodiments.

At S803, based on a positive correlation between the distance parameter and the delay duration, a delay duration corresponding to the distance parameter is determined as a target delay duration.

The positive correlation between the distance parameter and the delay duration means that the distance parameter is directly proportional to the delay duration. When the distance parameter is the distance value, the larger the distance value, the larger the delay duration; and the smaller the distance value, the smaller the delay duration. In other words, the smaller the distance, the earlier the sound is heard.

In some implementations, second correspondences between distance parameters and delay durations may be set in advance, and there is a positive correlation between the distance parameter and the delay duration in the second correspondence. After the distance between the wireless earphone and the sound source device is determined as the distance parameter, the distance parameter is taken as the target distance parameter, and a delay duration corresponding to the target distance parameter is looked up in the second correspondences.

In some implementations, a relationship equation may be preset to determine the delay duration. The preset relationship equation is as follows:

$$M = \frac{d}{v} \times fs \tag{2}$$

where M represents the delay duration, d represents the distance value, v represents a propagation speed of the sound, i.e., 340 m/s, fs represents a sampling rate in signal processing, the calculation of d may be referred to the foregoing contents. The delay duration M is measured in the number of sampling points, e.g., when M is 2, it means 2 sampling points.

At S804, a to-be-played audio signal is played, based on the target spatial audio parameter.

The target spatial audio parameter includes the target gain parameter and the target delay duration.

In some implementations, there may be one wireless earphone, that is, the user may wear the wireless earphone in one ear. The wireless earphone adjusts, based on the distance parameter, the volume and playback time of the to-be-played audio signal, so that the user wearing the earphone on one ear can also perceive an auditory effect of the volume and delay of the audio signal with the change of the distance between the user and the sound source device.

In some implementations, there may be two wireless earphones, which are a first earphone and a second earphone. Based on the spatial position parameter of the first earphone, the spatial audio parameter of the first earphone is adjusted so as to obtain a first target spatial audio parameter. Based on the spatial position parameter of the second earphone, the spatial audio parameter of the second earphone is adjusted, so as to obtain a second target spatial audio parameter. The first earphone is controlled to play the audio signal based on the first target space audio parameter, and the second earphone is controlled to play the audio signal based on the second target space audio parameter. Therefore, each of the first earphone and the second earphone can adjust, based on the distance value of the respective earphone, the respective auditory effect of the volume and delay of the respective earphone; in addition, the first earphone and the second earphone can also realize the binaural effect based on the time difference and the volume difference between the two ears.

Specifically, a user's determination on a sound orientation is mainly affected by factors such as a time difference, a sound pressure difference, a human body filtering effect, and head rotation. The sound signal propagates from the sound source device to the ears through a comprehensive filtering process, which includes air filtering, reverberation of a surrounding environment, scattering and reflection by the human body (e.g., body, head, auricle) and other filtering processes.

Figure 9:
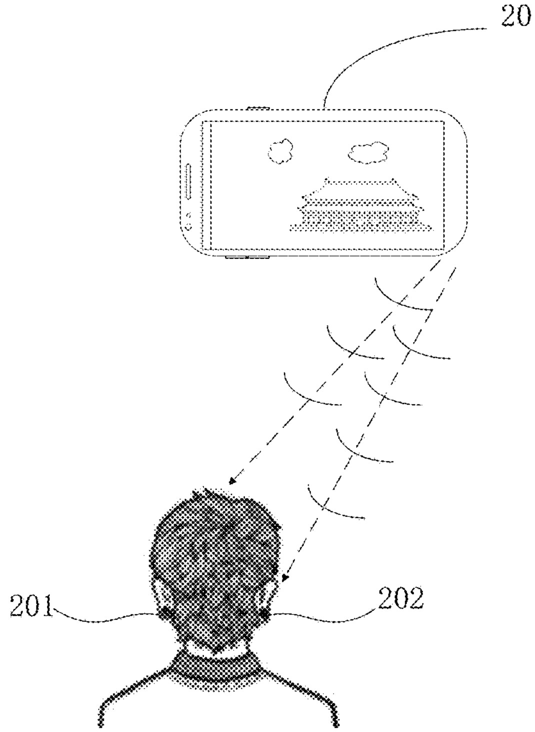
FIG. 9 is a schematic diagram illustrating a time difference between times at which a sound reaches left and right ears according to some embodiments of the disclosure.

Referring to FIG. 9, the distance between the audio playback device 20 and the left ear is different from the distance between the audio playback device 20 and the right ear, and in a case where the audio playback device 20 plays the sound externally, an arrival time at which the sound transmitted from the audio playback device 20 arrives at the left ear is different from an arrival time at which the sound transmitted from the audio playback device 20 arrives at right ear, and the right ear hears the sound earlier than the left ear. That is, since the distances from the sound source device to the two ears are different, there is a difference between the arrival times at which the sound arrives at the left ear and the right ear respectively, and such difference is called the time difference. In addition, the right ear is closer to the audio playback device 20 than the left ear, and the volume of the sound heard in the right ear should be higher than the volume of the sound heard in the left ear. It is assumed that there are two wireless earphones, i.e., a first earphone 201 and a second earphone 202, and the user wears the first earphone 201 on the left ear and wears the second earphone 202 on the right ear. Under such assumption, the distance between the first earphone 201 and the sound source device is named as a first distance value, the distance between the second earphone 202 and the sound source device is named as a second distance value, and the first distance value is greater than the second distance value. The first target spatial audio parameter corresponding to the first distance value includes a first gain parameter and a first delay duration, and the second target spatial audio parameter corresponding to the second distance value includes a second gain parameter and a second delay duration. The first gain parameter is less than the second gain parameter, so that the volume of the sound heard in the left ear is less than the volume of the sound heard in the right ear, thereby creating a binaural volume difference, i.e., a sound level difference. The first delay duration is greater than the second delay duration, and the right ear hears the sound earlier than the left ear, resulting in a binaural time difference.

Figure 10:
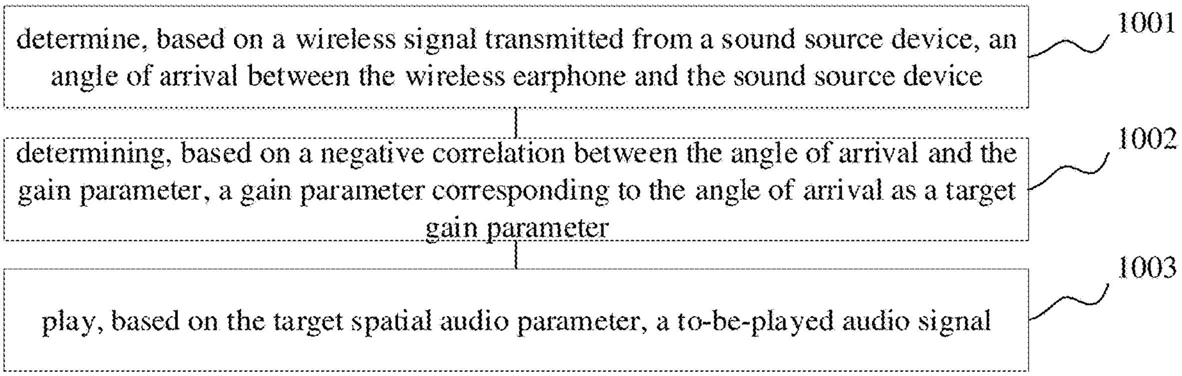
FIG. 10 is yet another schematic flowchart of the audio processing method according to some embodiments of the disclosure.

Referring to FIG. 10, FIG. 10 illustrates an audio processing method, in which the spatial position parameter includes an angle of arrival, and the spatial audio parameter includes a gain parameter. In some implementations, the method may be executed by the processor as described above. Specifically, the method includes S1001 to S1003.

At S1001, the angle of arrive between wireless earphone and a sound source device is determined, based on a wireless signal transmitted from the sound source device.

In some implementations, the wireless earphone are provided with a first wireless communication device, the sound source device is provided with a second wireless communication device. Through a communication connection between the first wireless communication device and the second wireless communication device, a wireless communication link can be established between the wireless earphone and the sound source device, thereby realizing wireless communication between the wireless earphone and the sound source device. The first wireless communication device includes a first antenna and the second wireless communication device includes a second antenna. When there are multiple first antennas, for example, there are at least two first antennas, the wireless signal transmitted from the second antenna travel different distances to reach the individual first antennas, thereby generating a phase difference. Based on the phase difference, an angle of arrival from the sound source device to the wireless earphone can be calculated, that is, the angle of arrival between the wireless earphone and the sound source device can be obtained.

Specifically, assuming that a data vector of the audio signal is x(t), and that a signal undergoes phase shift and is scaled with a sinusoidal (narrow band) signal, the following equation is obtained:

$$x(t) = a(\theta)s(t) + n(t) \tag{3}$$

-continued $$a(\theta) = \left[1,\ e^{j2\pi d' \sin(\theta)/\lambda}, \ldots, e^{j2\pi(m-1)d' \sin(\theta)/\lambda}\right] \tag{4}$$

In the above equations (3) and (4), a(θ) represents a mathematical model of an antenna array, i.e., an array control vector, s(t) represents an incident signal, n(t) is a noise signal, d' represents a distance between adjacent antennas in the antenna array, and m represents the number of antennas in the antenna array.

A covariance matrix is obtained through the following equation (5):

$$R_{xx} \approx \frac{1}{N}\sum_{t=1}^{N} x(t)x^H(t) \tag{5}$$

A spatial spectrum is calculated using a(θ) and the covariance matrix Rxx, and the following equation is obtained:

$$P(\theta) = \frac{a^H(\theta)R_{xx}a(\theta)}{a^H(\theta)a(\theta)} \tag{6}$$

A maximum peak of the spatial spectrum is determined, and θ corresponding to the maximum peak is the angle of arrival.

In some implementations, there are multiple first antennas in the wireless earphone, and the multiple first antennas form an antenna array. The angle of arrival is determined based on phase differences generated when the wireless signal of the sound source device arrives at the multiple first antennas in the antenna array.

Alternatively, there may be one first antenna in the wireless earphone, and there are multiple second antennas on the sound source device, and distances between the multiple second antennas on the sound source device can be determined. Thus, an angle of arrival of the wireless signal transmitted from the first antennae to the second antennas may be determined, so that the angle of arrival at which the wireless signal transmitted from the sound source device arrives at the wireless earphone can be determined, based on the geometric principle.

At S1002, based on a negative correlation between the angle of arrival and the gain parameter, a gain parameter corresponding to the angle of arrival is determined as a target gain parameter.

Figure 11:
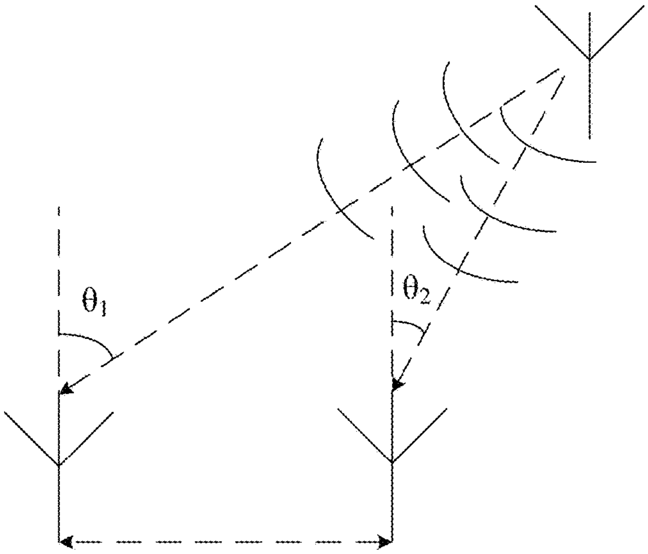
FIG. 11 is a schematic diagram illustrating an angle of arrival according to some embodiments of the disclosure.

The negative correlation between the angle of arrival and the gain parameter means that the angle of arrival is inversely proportional to the gain parameter. When the gain parameter is the volume value, the greater the angle of arrival, the smaller the volume value; and the smaller the angle of arrival, the greater the volume value. Referring to FIGS. 11, $\theta_1$ and $\theta_2$ are respectively angles of arrival from the second antenna in the sound source device to the two first antennas.

When a user wears two wireless earphones, for example, when the user wears a first earphone in the left ear and wears a second earphone in the right ear, if the sound source device is directly in front of the user and located at an intermediate position, the angle of arrival between the sound source device and the first earphone is the same as the angle of arrival between the sound source device and the second earphone. When the user turns his head in a direction of the left ear, the angle of arrival between the sound source device and the first earphone is greater than the angle of arrival between the sound source device and the second earphone. When the user turns his head in a direction of the right ear, the angle of arrival between the sound source device and the first earphone is less than the angle of arrival between the sound source device and the second earphone.

In some implementations, third correspondences between angles of arrival and gain parameters may be set in advance. In such third correspondences, there is a negative correlation between the angle of arrival and the gain parameter. After the angle of arrival between the wireless earphone and the sound source device is determined, the angle of arrival is taken as the target angle of arrival, and a gain parameter corresponding to the target angle of arrival is looked up in the third correspondences, so as to obtain the target gain parameter.

In other implementations, a relationship equation between angle and volume relationship equation is set to determine the gain parameter. In such equation, the greater the angle of arrival, the smaller the gain parameter, i.e., the angle of arrival is negatively correlated with the gain parameter. Specifically, the equation between the gain parameter and the angle of arrival is as follows:

$$G = g + \frac{180 - \theta}{180} \tag{7}$$

where θ represents the angle of arrival, g is a gain correction factor that is related to parameters such as, an amplifier and speaker sensitivity of the wireless earphone sound system, a distance between a Bluetooth transmitter of an audio and video electronic device and a Bluetooth receiver of the earphone. Specifically, g may be determined according to the use of demand.

In some implementations, considering that at some angles, the user's head may create significant interference to the sound transmitted from the sound source device, an angle threshold may be set. When the angle of arrival is less than the angle threshold, a gain parameter is first determined, based on the third correspondences or the angle-volume relationship equation, as an initial gain parameter, and then the initial gain parameter is reduced by a second specified value to obtain a target gain parameter. When the angle of arrival is greater than that angle threshold, the gain parameter determined based on the third correspondences or the angle-volume relationship equation is taken as the target gain parameter.

At S1003, a to-be-played audio signal is played, based on the target spatial audio parameter.

Specifically, the implementation of S1003 may refer to the afore-mentioned embodiments, and the details are not described here again.

Figure 12:
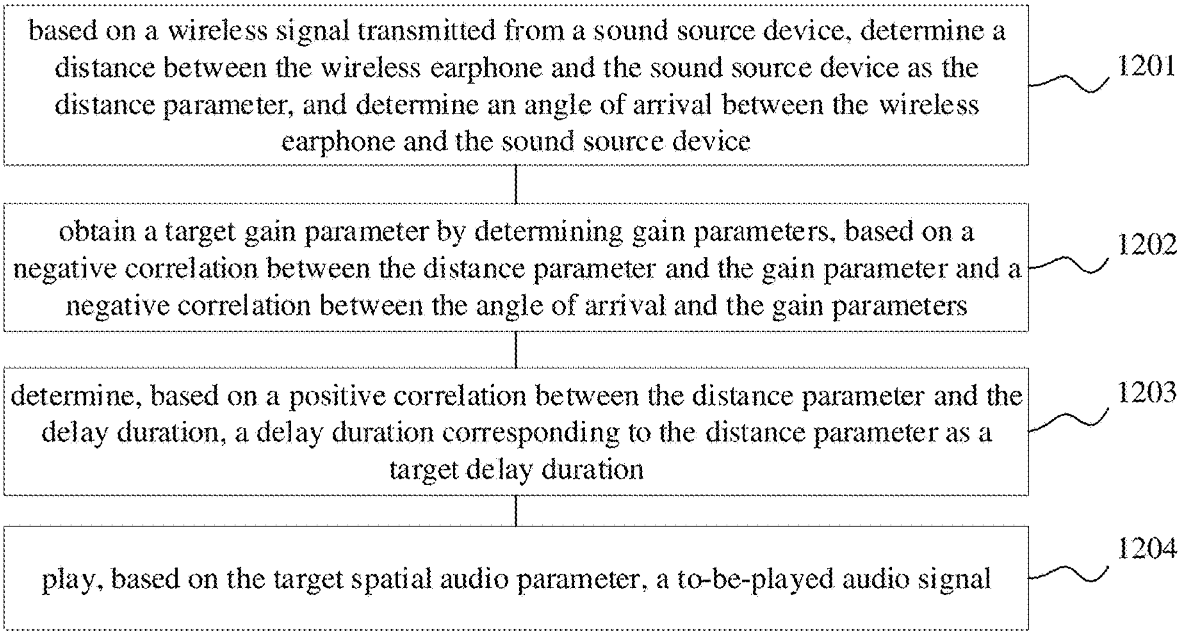
FIG. 12 is still another schematic flowchart of the audio processing method according to some embodiments of the disclosure.

Referring to FIG. 12, FIG. 12 illustrates an audio processing method, in which the spatial position parameter includes a distance parameter and an angle of arrival, and the spatial audio parameter includes a gain parameter and a delay duration. In some implementations, the method may be executed by a processor as described above. Specifically, the method includes S1201 to S1204.

At S1201, based on a wireless signal transmitted from a sound source device, a distance between the wireless earphone and the sound source device is determined as the distance parameter, and the angle of arrival between the wireless earphone and the sound source device is determined.

At S1202, a target gain parameter is obtained by determining gain parameters based on a negative correlation between the distance parameter and the gain parameter and a negative correlation between the angle of arrival and the gain parameter.

In some implementations, based on the negative correlation between the distance parameter and the gain parameter, a gain parameter corresponding to the distance is determined as a first gain parameter. The implementation of determining the first gain parameter may refer to the afore-mentioned embodiments, and the details are not described here again. Based on the negative correlation between the angle of arrival and the gain parameter, a gain parameter corresponding to the angle of arrival is determined as a second gain parameter. The implementation of determining the second gain parameter may refer to the afore-mentioned embodiments, and the details are not described here again.

The target gain parameter is obtained based on the first gain parameter and the second gain parameter. In some implementations, an average gain parameter of the first gain parameter and the second gain parameter may be obtained as the target gain parameter. Of course, the target gain parameter may be alternatively obtained through weighted summation of the first gain parameter and the second gain parameter. Specifically, a first weight and a second weight may be set, a first product of the first weight and the first gain parameter is obtained, a second product of the second weight and the second gain parameter is obtained, and a sum of the first product and the second product is obtained as the target gain parameter. The first weight and the second weight may be set according to actual needs or experience, and a sum of the first weight and the second weight is 1. Specifically, the first weight indicates a percentage of the first gain parameter in the target gain parameter, and the second weight indicates a percentage of the second gain parameter in the target gain parameter.

In some implementations, considering that a change in the distance does not bring significant attenuation in volume of the sound in the case of a long distance, after the distance parameter is obtained, it is determined whether the distance parameter is greater than a specified distance threshold. When the distance parameter is greater than a specified distance threshold, the first weight is set to a first numerical value. When the distance parameter is less than or equal to the specified distance threshold, the first weight is set to a second numerical value. The first numerical value is less than the second numerical value, and the second weight is a difference between 1 and the first weight, i.e., $W2=1-W1$, where W2 represents the second weight and W1 represents the first weight. Thus, a decrease in the first weight causes an increase in the second weight. That is, in a case where the distance parameter is greater than the specified distance threshold, a percentage of the second gain parameter determined based on the angle of arrival is increased, whereas a percentage of the first gain parameter determined based on the distance parameter is decreased.

In some implementations, considering that the user's head creates significant obstruction to the sound transmitted from the sound source device in the case of a large angle of arrival, after the angle of arrival is obtained, it is determined whether the angle of arrival is greater than a specified angle threshold. When the angle of arrival is greater than the specified angle threshold, the second weight is set to a third numerical value; otherwise, the second weight is set to a fourth numerical value. The third numerical value is greater than the fourth numerical value, and the first weight is a difference between 1 and the second weight, i.e., $W1=1-W2$, where W2 represents the second weight and W1 represents the first weight. Thus, an increase in the second weight causes a decrease in the first weight. That is, in a case where the angle of arrival is greater than the specified angle threshold, a percentage of the second gain parameter determined based on the angle of arrival is increased, whereas a percentage of the first gain parameter determined based on the distance parameter is decreased. In this way, in the case of a large angle, since the angle of arrival has more significant influence on the gain parameter, the percentage of the gain parameter determined based on the angle of arrival should be increased.

At S1203, based on a positive correlation between the distance parameter and the delay duration, a delay duration corresponding to the distance parameter is determined as a target delay duration.

In some implementations, for the implementation of determining the delay duration based on the positive correlation between the distance parameter and the delay duration, reference may be made to the afore-mentioned embodiments, and the details are not described here again.

At S1204, a to-be-played audio signal is played, based on the target spatial audio parameter.

In some implementations, there may be two wireless earphones, i.e., a first earphone and a second earphone. Each of the first earphone and the second earphone determines the respective target spatial audio parameter based on the afore-mentioned method. The detailed implementation may refer to the afore-mentioned embodiments, and the details are not described here again.

Figure 13:
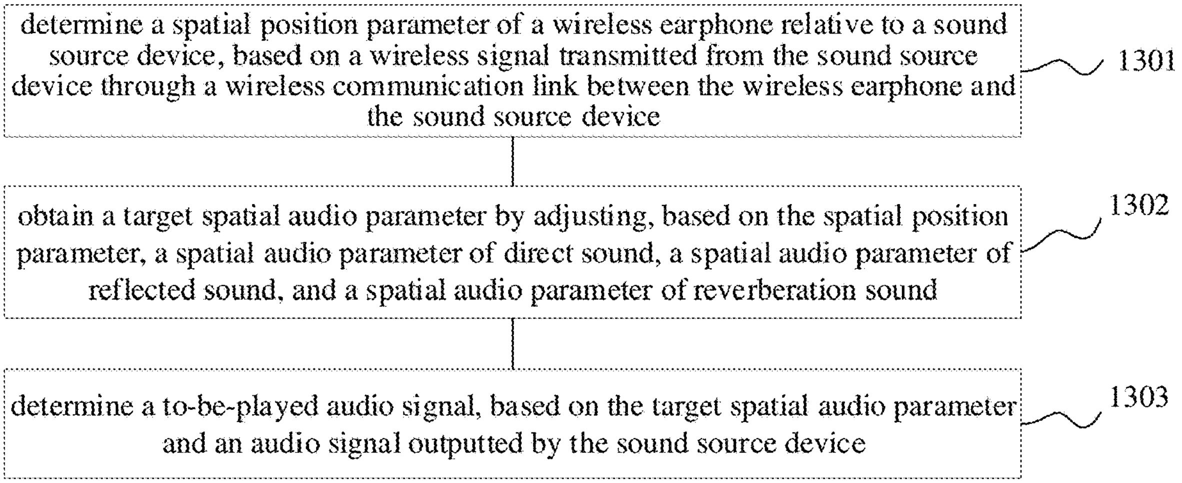
FIG. 13 is still yet another schematic flowchart of the audio processing method according to some embodiments of the disclosure.

Referring to FIG. 13, FIG. 13 illustrates an audio processing method, which is applied to the above-described wireless earphone. In some implementations, the method may be executed by the above-described processor. Specifically, the method includes S1301 to S1303.

At S1301, a spatial position parameter of a wireless earphone relative to a sound source device is determined, based on a wireless signal transmitted from the sound source device through a wireless communication link between the wireless earphone and the sound source device.

At S1302, a target spatial audio parameter is obtained by adjusting, based on the spatial position parameter, a spatial audio parameter of direct sound, a spatial audio parameter of reflected sound, and a spatial audio parameter of reverberation sound.

Figure 14:
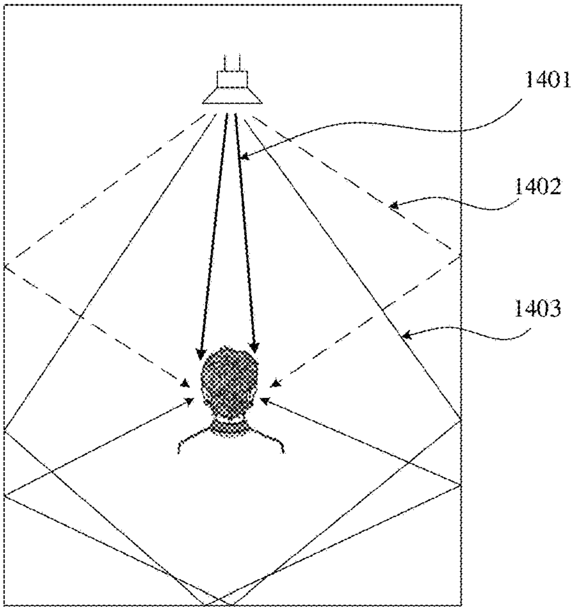
FIG. 14 is a schematic diagram illustrating a reverberant field according to some embodiments of the disclosure.

Referring to FIG. 14, a reverberation sound field generated through reflections by a surrounding environment has three components: a direct sound 1401, an early reflected sound 1402 and a reverberation sound 1403. People's spatial sense of sound is mainly established based on the early reflected sound and the reverberation sound. The user's perception of a size of a space is determined by an initial delay between the direct sound and the early reflected sound. In addition, the early reflected sounds may be from various directions in a three-dimensional space. The sound is continuously reflected and attenuated in the space, thereby forming a uniform and dense reverberation sound. The time and density of the reverberation sound reflect acoustic characteristics of the entire space. The reverberation sound, the direct sound and the early reflected sound together establish an indoor acoustic field. FIG. 14 illustrates the propagation of the sound in the space and a formed reverberation sound field. Through the reverberation sound field, a listener perceives different delays and loudness of the early reflected sounds from different directions, which helps the listener to determine the position and distance of the sound source device, and this can enable the listener to perceive his/her own position in the space to a certain extent.

In some implementations, since the spatial audio parameter includes a gain parameter and a delay duration, the spatial audio parameter of direct sound includes a gain parameter of direct sound and a delay duration of direct sound. The spatial audio parameter of reflected sound includes a gain parameter of reflected sound and a delay duration of reflected sound. The spatial audio parameter of reverberation sound includes a gain parameter of reverberation sound and a delay duration of reverberation sound.

In some implementations, the spatial audio parameter of direct sound, the spatial audio parameter of reflected sound and the spatial audio parameter of reverberation sound may be determined through the method described above, i.e., based on the spatial position parameter. In some other implementations, as illustrated in FIG. 14, since the direct sound, the reflected sound and the reverberation sound have different propagation speeds and the quantities of reflections in a space, they have different sound pressure levels and arrival times at which they arrive at the human ear. Specifically, the sound pressure levels of the direct sound, the reflected sound and the reverberation sound decrease successively, and the arrival times at which the direct sound, the reflected sound and the reverberation sound arrive at the human ear increase successively. Thus, the spatial audio parameter of direct sound may be determined first, then the spatial audio parameter of reflected sound may be determined based on the spatial audio parameter of direct sound. Thereafter, the spatial audio parameter of reverberation sound may be determined based on the spatial audio parameter of reflected sound.

In some implementations, the spatial audio parameter of direct sound may be determined directly according to the method embodiments described above. Specifically, the spatial audio parameter of direct sound may be determined based on the distance parameter, or based on the angle of arrival, or based on both the distance parameter and the angle of arrival. As illustrated in FIG. 5, a delay parameter of the delay module 2121, i.e., a length of time for which an output signal from the delay module 2121 is delayed, is set based on the delay duration of the direct sound, so that a time at which the direct sound arrives at the human ear can be set. As illustrated in FIG. 5, the amplitude modulation module 216 is configured to adjust the gain parameter for the direct sound, the reflected sound, and the reverberation sound as a whole, so that the playback volume of the direct sound, the reflected sound, and the reverberation sound can be adjusted on the whole. In some implementations, the spatial audio parameter further includes a specified gain parameter. The direct sound signal, the reflected sound signal and the reverberation sound signal are mixed to obtain a mixed audio signal. Amplitude modulation is performed, based on the specified gain parameter, on the mixed audio signal to obtain the to-be-played audio signal. Of course, since the sound output from the delay module can be regarded as the direct sound, and the direct sound is sequentially input into the reflection sound module and the reverberation sound module, the amplitude modulation module 216 may also be arranged after the delay module and before the reflected sound module, the reverberation sound module. Specifically, after the delay module delays the audio signal, a gain of the audio signal is adjusted based on a gain parameter of the amplitude modulation module 216 to obtain the direct sound signal, in which the gain parameter of the amplitude modulation module 216 is set based on the gain parameter of direct sound. Then, the direct sound signal is input to the reflected sound module and the reverberation sound module.

Then, the gain parameter of reflected sound is set based on the gain parameter of direct sound. Specifically, the gain parameter of direct sound may be decreased by a first specified gain parameter to obtain the gain parameter of reflected sound. The delay duration of reflected sound may be set based on the delay duration of direct sound. Specifically, the delay duration of direct sound is increased by a first specified delay duration to obtain the delay duration of reflected sound. As illustrated in FIG. 5, the reflected sound may be obtained through the first all-pass filter 2131. That is, the reflected sound may be obtained by adjusting, based on the determined gain parameter of reflected sound and the delay duration of reflected sound, the parameter of the first all-pass filter 2131, e.g., a delay duration of a delayer and a gain value of a gain module in the first all-pass filter 2131. Different spatial audio parameters may be set for different first all-pass filters 2131, thereby realizing superposition of multiple different reflected sounds.

Then, the gain parameter of reverberation sound is set based on the gain parameter of reflected sound. Specifically, the gain parameter of reflected sound may be decreased by a second specified gain parameter to obtain the gain parameter of reverberation sound. The delay duration of reverberation sound is set based on the delay duration of reflected sound. Specifically, the delay duration of reflected sound may be increased by a second specified delay duration to obtain the delay duration of reverberation sound. As illustrated in FIG. 5, the reverberation sound may be obtained through the second all-pass filter 2141. That is, the reverberation sound may be obtained by adjusting, based on the determined gain parameter of reverberation sound and the delay duration of reverberation sound, the parameter of the second all-pass filter 2141, e.g., a delay duration of a delayer and a gain value of a gain module in the second all-pass filter 2141. The density of the reverberation sound may be increased by a series connection of the multiple second all-pass filters 2141. In addition, a gain parameter of the low-pass filter 2142 may be set to reduce the volume of a high-frequency component of the sound output from the multiple second all-pass filters 2141 connected in series, thereby simulating high-frequency attenuation damping.

S1303, a to-be-played audio signal is determined, based on the audio parameter of direct sound, the audio parameter of reflected sound, and the audio parameter of reverberation sound.

Specifically, a direct sound signal of the audio signal is determined based on the audio parameter of direct sound; a reflected sound signal of the audio signal is output based on the audio parameter of reflected sound; and a reverberation sound signal of the audio signal is output based on the audio parameter of the reverberation sound. The to-be-played audio signal is obtained by mixing the direct sound signal, the reflected sound signal, and the reverberation sound signal.

As described in the above embodiments, the direct sound module is configured to output the direct sound signal of the audio signal, based on the audio parameter of direct sound; the reflected sound module is configured to output the reflected sound signal of the audio signal, based on the audio parameter of reflected sound; the reverberation sound module is configured to output the reverberation sound signal of the audio signal based on the audio parameter of the reverberation sound; and the first mixer is configured to mix the direct sound signal, the reflected sound signal, and the reverberation sound signal, to obtain the to-be-played audio signal.

Specifically, a parameter of the direct sound module is set based on the audio parameter of direct sound, a parameter of the reflected sound module is set based on the audio parameter of reflected sound, and a parameter of the reverberation sound module is set based on the audio parameter of reverberation sound. In particularly, the set parameter may include a gain parameter and a delay parameter of the module, which are specifically determined based on the spatial audio parameter of each module.

In some implementations, the audio parameter of direct sound includes a delay duration of direct sound, the audio parameter of reflected sound includes a gain parameter of reflected sound and a delay duration of reflected sound, and the audio parameter of reverberation sound includes a gain parameter of reverberation sound and a delay duration of reverberation sound. The direct sound module delays the audio signal based on the delay duration of direct sound, thereby obtaining the direct sound signal. The reflected sound module performs, based on the gain parameter of reflected sound, volume adjustment on components of the direct sound signal in a whole frequency band range, and performs, based on the delay duration of reflected sound, on the components of the direct sound signal in the whole frequency band range, thereby obtaining the reflected sound signal. The reverberation sound module performs, based on the gain parameter of reverberation sound, volume adjustment on a component at a specified frequency band of the reflected sound signal, and performs, based on the delay duration of reverberation sound, on the component at the specified frequency band of the reflected sound signal, thereby obtaining the reverberation sound signal.

Specifically, as illustrated in FIG. 5, the delay module 2121 is used as the direct sound module. The audio signal is input into the delay module 2121, and is delayed, by the delay module 2121, based on the delay duration of direct sound to obtain the direct sound signal. Then, the direct sound signal is inputted into the first mixer 215 and each of the three first all-pass filters 2131. Each of the first all-pass filters 2131 performs volume adjustment and delay processing on the components of the direct sound signal in the whole frequency band range, to obtain a reflected sound sub-signal, and the second mixer mixes multiple reflected sound sub-signals to form the reflected sound signal. The density and complexity of the reflected sound can be increased by setting multiple first all-pass filters. In some implementations, the gain parameter and the delay parameter may be different or the same among the individual first all-pass filters. For example, the gain parameter and the delay parameter of each first all-pass filter may be the gain parameter of reflected sound and the delay duration of reflected sound respectively. The gain parameters and the delay parameters of the M second all-pass filters 2141 are set, based on the audio parameter of reverberation sound. In some implementations, the low-pass filter 2142 may be arranged before the M second all-pass filters 2141. An output of the reflected sound module 213 is connected to an input of the second filter bank through the low-pass filter 2142, and an output of the second filter bank is connected to a third input of the first mixer 215. The low-pass filter is used to filter out a high-frequency component of the reflected sound signal, and retain a low-frequency component of the reflected sound signal. The M second all-pass filters are used to successively perform volume adjustment and delay processing on the low-frequency component of the reflected sound signal, to obtain the reverberation sound signal.

The first mixer 215 mixes the direct sound signal, the reflected sound signal and the reverberation sound signal to obtain a mixed audio signal, and inputs the mixed audio signal to the amplitude modulation module 216. The amplitude modulation module 216 performs, based on the specified gain parameter, amplitude modulation on the mixed audio signal, to obtain the to-be-played audio signal.

In some implementations, after the spatial position parameter of the wireless earphone relative to the sound source device is determined, the specified gain parameter and a specified delay parameter are determined based on the foregoing implementations. The specified delay parameter is taken as the delay duration of direct sound, i.e., as the delay parameter of the delay module 2121, and the specified gain parameter is taken as the gain parameter of the amplitude modulation module 216.

Then, the audio parameter of reflected sound and the audio parameter of reverberation sound are determined, based on the delay duration of direct sound and the specified gain parameter. Specifically, the gain parameter of reflected sound and the gain parameter of reverberation sound are obtained by decreasing the specified gain parameter, and the delay duration of reflected sound and the delay duration of reverberation sound are obtained by increasing the specified delay duration parameter.

Specifically, the gain parameter of reflected sound and the gain parameter of reverberation sound may both be a negative gain, so that the reflected sound and the reverberation sound are further attenuated on the basis of the direct sound. In some implementations, the gain parameter of reverberation sound is less than the gain parameter of reflected sound, i.e., the attenuation of the reverberation sound is more severe than the attenuation of the reflected sound. Both the delay duration of reflected sound and the delay duration of reverberation sound are positive, so that the reflected sound and the reverberation sound are further delayed on the basis of the direct sound. In some implementations, the delay duration of reverberation sound is greater than the delay duration of reflected sound, i.e., the delay of the reverberation sound is longer than the delay of the reflected sound. Specifically, the gain parameter of reflected sound and the gain parameter of reverberation sound, as well as the delay duration of reflected sound and the delay duration of reverberation sound, may be set in accordance with variations and demands of the spatial audio of the earphone within an environment in actual use, and is not limited herein.

It is notable that, a part not described in detail in this method can be referred to the foregoing embodiments and will not be repeated herein.

Figure 15:
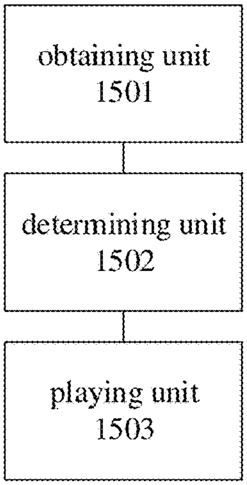
FIG. 15 is a block diagram of modules of an audio processing apparatus according to some embodiments of the disclosure.

Referring to FIG. 15, FIG. 15 is a block diagram of modules of an audio processing apparatus according to some embodiments of the disclosure. The audio processing apparatus 1500 may include an obtaining unit 1501, a determining unit 1502, and a playing unit 1503.

The obtaining unit 1501 is configured to determine, based on a wireless signal transmitted from a sound source device, a spatial position parameter of a wireless earphone, where the spatial position parameter is used to indicate a spatial position relationship between the wireless earphone and the sound source device.

The determining unit 1502 is configured to obtain a target spatial audio parameter by determining, based on the spatial position parameter, a spatial audio parameter of the wireless earphone.

In some implementations, the spatial position parameter includes at least one of a distance parameter and an angle of arrival, and the spatial audio parameter includes a gain parameter and a delay duration.

Furthermore, the determining unit 1502 is further configured to: determine, based on a negative correlation between the distance parameter and the gain parameter, a target gain parameter; and determine, based on a positive correlation between the distance parameter and the delay duration, a target delay duration.

Furthermore, the determining unit 1502 is further configured to: determine, based on a negative correlation between the angle of arrival and the gain parameter, a target gain parameter.

Furthermore, the determining unit 1502 is further configured to: determine gains parameters, based on the negative correlation between the distance parameter and the gain parameter and a negative correlation between the angle of arrival and the gain parameter, so as to determine a target gain parameter; and determine, based on a positive correlation between the distance parameter and the delay duration, a target delay duration.

Furthermore, the determining unit 1502 is further configured to: obtain the target spatial audio parameter by adjusting, based on the spatial position parameter, a spatial audio parameter of direct sound, a spatial audio parameter of reflected sound, and a spatial audio parameter of reverberation sound.

The processing unit 1503 is configured to determine a to-be-played audio signal, based on the target spatial audio parameter and an audio signal outputted by the sound source device.

Furthermore, there are two wireless earphones, i.e., a first earphone, and a second earphone. The determining unit 1502 is further configured to: adjust a spatial audio parameter of the first earphone based on the spatial position parameter of the first earphone, thereby obtaining a first target spatial audio parameter; adjust a spatial audio parameter of the second earphone based on a spatial position parameter of the second earphone, thereby obtaining a second target spatial audio parameter. The playing unit 1503 is further configured to: control the first earphone to play the audio signal, based on the first target space audio parameter, and control the second earphone to play the audio signal based on the second target space audio parameter.

Those skilled in the art will clearly appreciate that, for the convenience and simplicity of the description, the specific operation processes of the above apparatus and modules can be referred to the corresponding processes in the above method embodiments and will not be repeated herein.

In the exemplary embodiments provided in the disclosure, a coupling between the modules may be electrical, mechanical, or in other forms.

Furthermore, various functional modules in the various exemplary embodiments of the disclosure may be integrated in one processing module, or each module may physically exist separately, or two or more modules may be integrated in a single module. The above integrated modules may be implemented either in the form of hardware or in the form of software functional modules.

Figure 16:
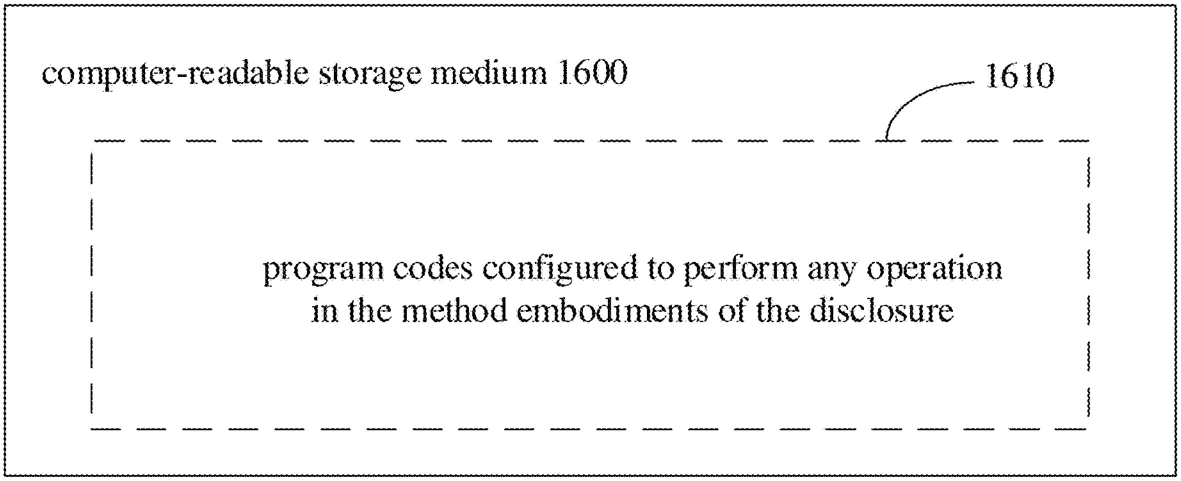
FIG. 16 illustrates a storage unit according to some embodiments of the disclosure, which is configured to save or carry program codes for implementing the audio processing method according to embodiments of the disclosure.

Referring to FIG. 16, which illustrates a structural block diagram of a non-transitory computer-readable medium according to some embodiments of the disclosure. The computer-readable medium 1600 has program codes stored thereon, and the program codes may be called by a processor to execute the method described in the above method embodiments.

The computer-readable storage medium 1600 may be an electronic memory such as a flash memory, electrically erasable programmable read-only memory (EEPROM), EPROM, hard disk, or ROM. In some implementations, the computer-readable storage medium 1600 includes a non-transitory computer-readable storage medium. The computer-readable storage medium 1600 has a storage space for program codes 1610 that perform any operation in the above methods. The program codes may be read from or written to one or more computer program products. The program codes 1610 may be compressed, for example, in an appropriate form.

Based on the above, the embodiments of the disclosure provide the audio processing method, the audio processing apparatus, the wireless earphone, and the computer-readable medium. Specifically, the spatial position relationship between the wireless earphone and the sound source device can be determined, based on the wireless signal therebetween. Compared with the schemes of using the image sensor and the motion sensor, no additional hardware needs to be installed in the wireless earphone, i.e., the cost of the wireless earphone is not increased; in addition, the determined spatial position is more accurate.

Through a real-time measurement of the distance the angle between the Bluetooth signal transmitter and the Bluetooth signal receiver, the localization of the wireless earphone relative to the sound source device are realized, and binaural spatial sound rendering processing is performed on the audio signal transmitted from the sound source device through Bluetooth, so as to simulate the effect of vivid and immersive listening experience. By simulating spatial acoustic scenarios in real-time, every user can experience best listening at different locations, which brings the best immersive spatial acoustic experience. Through the spatial acoustic rendering, an in-head effect can be eliminated, thereby improving the user experience of the earphone. A storage space of the wireless earphone is saved. Specifically, the solution adjusts binaural parameters in the spatial acoustic algorithm in real time, instead of pre-setting a measured spatial binaural impulse response (BRIR), which saves a large amount of storage space and a computing power of the algorithm. The cost and power consumption are saved. Specifically, the spatial audio rendering parameters of binaural impulse response are changed in real-time through the Bluetooth localization function, so that no additional hardware cost and power consumption are incurred, and the endurance of the earphone is also improved.

Figure 17:
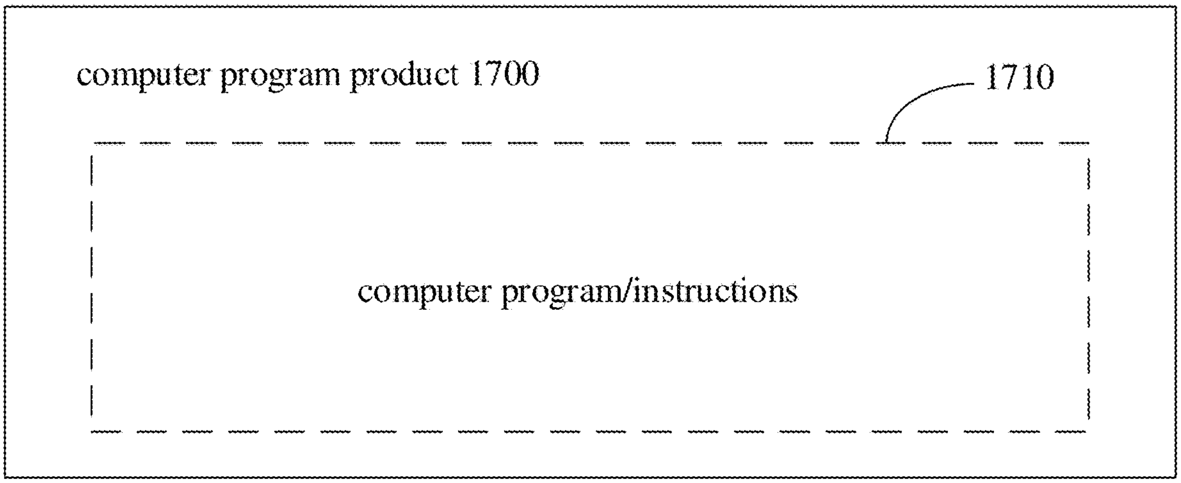
FIG. 17 illustrates a structural block diagram of a computer program product according to some embodiments of the disclosure.

Referring to FIG. 17, which illustrates a computer program product 1700 according to some embodiments of the disclosure. The computer program product 1700 includes a computer program/instructions 1710 which, when being executed by a processor, cause the above method to be implemented.

Finally, it is notable that, the above embodiments are merely intended to illustrate but not to limit the technical solutions of the disclosure. Although the disclosure has been described in detail with reference to the foregoing embodiments, it can be understood that, those of ordinary skill in the art can modify the technical solutions described in the foregoing embodiments or make equivalent substitutions for some technical features therein. These modifications or substitutions do not drive the essence of the corresponding technical solutions away from the spirit and scope of the technical solutions of the embodiments of the disclosure.

What is claimed is:

1. An audio processing method, wherein the method is performed by a wireless earphone, and the method comprises:

determining, based on a wireless signal transmitted from a sound source device, a spatial position parameter of the wireless earphone, wherein the spatial position parameter is used to indicate a spatial position relationship between the wireless earphone and the sound source device;

obtaining a target spatial audio parameter by determining, based on the spatial position parameter, a spatial audio parameter of the wireless earphone, comprising:

determining, based on the spatial position parameter, a specified gain parameter and a specified delay parameter;

taking the specified delay parameter as an audio parameter of direct sound;

obtaining, based on the specified gain parameter, a gain parameter of reflected sound and a gain parameter of reverberation sound; and obtaining, based on the specified delay parameter, a delay duration of reflected sound and a delay duration of reverberation sound; and determining a to-be-played audio signal, based on the target spatial audio parameter and an audio signal outputted by the sound source device, comprising:

determining, based on the audio parameter of direct sound, a direct sound signal of the audio signal;

outputting, based on the gain parameter of reflected sound and the delay duration of reflected sound, a reflected sound signal of the audio signal;

outputting, based on the gain parameter of reverberation sound and the delay duration of reverberation sound, a reverberation sound signal of the audio signal; and mixing the direct sound signal, the reflected sound signal and the reverberation sound signal, and obtaining the to-be-played audio signal.

2. The method as claimed in claim 1, wherein the spatial position parameter comprises at least one of a distance parameter and an angle of arrival, and the spatial audio parameter comprises at least one of a gain parameter and a delay duration.

3. The method as claimed in claim 2, wherein the spatial position parameter comprises the distance parameter, and determining, based on the spatial position parameter, the specified gain parameter and the specified delay parameter comprises:

determining, based on a negative correlation between the distance parameter and the gain parameter, the specified gain parameter; and determining, based on a positive correlation between the distance parameter and the delay duration, as the specified delay duration.

4. The method as claimed in claim 2, wherein the spatial position parameter comprises the angle of arrival, and determining, based on the spatial position parameter, the specified gain parameter and the specified delay parameter comprises:

determining, based on a negative correlation between the angle of arrival and the gain parameter, as the specified gain parameter.

5. The method as claimed in claim 2, wherein the spatial position parameter comprises the distance parameter and the angle of arrival, and determining, based on the spatial position parameter, the specified gain parameter and the specified delay parameter, comprises:

obtaining the specified gain parameter, based on a negative correlation between the distance parameter and the gain parameter and a negative correlation between the angle of arrival and the gain parameter; and determining, based on a positive correlation between the distance parameter and the delay duration, the specified delay duration.

6. The method as claimed in claim 5, wherein obtaining the specified gain parameter based on the negative correlation between the distance parameter and the gain parameter and the negative correlation between the angle of arrival and the gain parameter, comprises:

determining, based on the negative correlation between the distance parameter and the gain parameter, a gain parameter corresponding to the distance parameter as a first gain parameter;

determining, based on the negative correlation between the angle of arrival and the gain parameter, a gain parameter corresponding to the angle of arrival as a second gain parameter; and obtaining the specified gain parameter, based on the first gain parameter and the second gain parameter.

7. The method as claimed in claim 6, wherein obtaining the specified gain parameter based on the first gain parameter and the second gain parameter, comprises:

obtaining, as the specified gain parameter, an average gain parameter of the first gain parameter and the second gain parameter; or setting a first weight and a second weight, obtaining a first product of the first weight and the first gain parameter, and obtaining a second product of the second weight and the second gain parameter; and obtaining, as the specified gain parameter, a sum of the first product and the second product.

8. The method as claimed in claim 1, wherein determining, based on the audio parameter of direct sound, the direct sound signal of the audio signal, comprises:

obtaining the direct sound signal, by delaying the audio signal based on the delay duration of direct sound.

9. The method as claimed in claim 8, wherein outputting, based on the gain parameter of reflected sound and the delay duration of reflected sound, the reflected sound signal of the audio signal, comprises:

obtaining the reflected sound signal, by performing, based on the gain parameter of reflected sound, volume adjustment on components of the direct sound signal in a whole frequency band range, and by performing, based on the delay duration of reflected sound, delay processing on the components of the direct sound signal in the whole frequency band range.

10. The method as claimed in claim 9, wherein obtaining the reflected sound signal by performing, based on the gain parameter of reflected sound, the volume adjustment on the components of the direct sound signal in the whole frequency band range, and by performing, based on the delay duration of reflected sound, the delay processing on the components of the direct sound signal in the whole frequency band range, comprises:

setting, based on the gain parameter of reflected sound and the delay duration of reflected sound, a gain parameter and a delay parameter for each of N first all-pass filters;

obtaining a reflected sound sub-signal by performing, with each of the first all-pass filters, the volume adjustment and the delay processing on the components of the direct sound signal in the whole frequency band range; and obtaining the reflected sound signal by mixing the reflected sound sub-signals obtained by the N first all-pass filters.

11. The method as claimed in claim 9, wherein outputting, based on the gain parameter of reverberation sound and the delay duration of reverberation sound, the reverberation sound signal of the audio signal, comprises:

obtaining the reverberation sound signal, by performing, based on the gain parameter of reverberation sound, volume adjustment on a component at a specified frequency band of the reflected sound signal, and by performing, based on the delay duration of reverberation sound, delay processing on the component at the specified frequency band of the reflected sound signal.

12. The method as claimed in claim 11, wherein obtaining the reverberation sound signal by performing, based on the gain parameter of reverberation sound, the volume adjustment on the component at the specified frequency band of the reflected sound signal, and by performing, based on the delay duration of reverberation sound, the delay processing on the component at the specified frequency band of the reflected sound signal, comprises:

setting, based on the gain parameter of reverberation sound and the delay duration of reverberation sound, a gain parameter and a delay parameter for each of M second all-pass filters;

filtering out, through a low-pass filter, a component of the reflected sound signal outside of the specified frequency band; and obtaining the reverberation sound signal by performing, through the M second all-pass filters successively, the volume adjustment and the delay processing on the component at the specified frequency band of the reflected sound signal.

13. A wireless earphone, comprising: an audio processing circuit, a loudspeaker, and a wireless signal receiver connected to the audio processing circuit, wherein the wireless signal receiver is configured to obtain a wireless signal transmitted from a sound source device; and wherein the audio processing circuit comprises an audio regulator and a processor connected to the audio regulator;

the processor is configured to: determine a spatial position parameter of the wireless earphone, based on the wireless signal that is transmitted from the sound source device and received by the wireless signal receiver; and obtain a target spatial audio parameter by determining, based on the spatial position parameter, a spatial audio parameter of the wireless earphone; and the audio regulator is configured to obtain a to-be-played audio signal by regulating, based on the target spatial audio parameter, an audio signal outputted by the sound source device;

wherein the spatial position parameter comprises a distance parameter and an angle of arrival, and the spatial audio parameter comprises a gain parameter and a delay duration, and the processor is specifically configured to:

determine, based on a negative correlation between the distance parameter and the gain parameter, a gain parameter corresponding to the distance parameter as a first gain parameter;

determine, based on a negative correlation between the angle of arrival and the gain parameter, a gain parameter corresponding to the angle of arrival as a second gain parameter;

obtain a target gain parameter, based on the first gain parameter and the second gain parameter; and determine a target delay duration, based on a positive correlation between the distance parameter and the delay duration.

14. The wireless earphone as claimed in claim 13, wherein the audio processing circuit further comprises: a first mixer, a direct sound circuit, a reflected sound circuit, and a reverberation sound circuit, wherein each of the direct sound circuit, the reflected sound circuit, and the reverberation sound circuit are connected to the processor and the first mixer, and the first mixer is connected to the loudspeaker; and the spatial audio parameter comprises a spatial audio parameter of direct sound, a spatial audio parameter of reflected sound, and a spatial audio parameter of reverberation sound;

the direct sound circuit is configured to output, based on the spatial audio parameter of direct sound, a direct sound signal of the audio signal;

the reflected sound circuit is configured to output, based on the spatial audio parameter of reflected sound, a reflected sound signal of the audio signal;

the reverberation sound circuit is configured to output, based on the spatial audio parameter of reverberation sound, a reverberation sound signal of the audio signal; and the first mixer is configured to mix the direct sound signal, the reflected sound signal and the reverberation sound signal, and obtain the to-be-played audio signal.

15. The wireless earphone as claimed in claim 14, wherein the direct sound circuit comprises a delayer, and the delayer is connected to each of an input of the reflected sound circuit and a first input of the first mixer, the delayer is configured to obtain the direct sound signal by delaying the audio signal based on the spatial audio parameter of direct sound;

the reflected sound circuit is further configured to obtain the reflected sound signal by performing, based on the spatial audio parameter of reflected sound, volume adjustment and delay processing on components of the direct sound signal in a whole frequency band range; and the reverberation sound circuit is further configured to obtain the reverberation sound signal by performing, based on the spatial audio parameter of reverberation sound, volume adjustment and delay processing on a component at a specified frequency band of the reflected sound signal.

16. The wireless earphone as claimed in claim 15, wherein the reflected sound circuit comprises a first filter bank and a second mixer, the first filter bank is connected to the delayer, the first filter bank comprises N first all-pass filters connected in parallel, and each of the first all-pass filters is connected to one input of the second mixer, an output of the second mixer is connected to each of an input of the reverberation sound delayer and a second input of the first mixer, where N is a positive integer;

each of the first all-pass filters is configured to obtain a reflected sound sub-signal by performing, based on the spatial audio parameter of reflected sound, the volume adjustment and the delay processing on the components of the direct sound signal in the whole frequency band range; and the second mixer is configured to obtain the reflected signal by mixing the reflected sound sub-signals output by the individual first all-pass filters.

17. The wireless earphone as claimed in claim 16, wherein the component at the specified frequency band is a low-frequency component, the reverberation sound circuit comprises a low-pass filter and a second filter bank, the second filter bank comprises M second all-pass filters connected in series, an output of the reflected sound circuit is connected to an input of the second filter bank through the low-pass filter, and an output of the second filter bank is connected to a third input of the first mixer, where Mis a positive integer;

the low-pass filter is configured to filter out a high-frequency component of the reflected sound signal; and the second all-pass filters are configured to perform, based on the spatial audio parameter of reverberation sound, volume adjustment and delay processing on the low-frequency component of the reflected sound signal, thereby obtaining the reverberation sound signal;

wherein the audio processing circuit further comprises an amplitude modulation circuit, an output of the first mixer is connected to an input of the amplitude modulation circuit, and an output of the amplitude modulation circuit is connected to the loudspeaker.

18. A non-transitory computer-readable storage medium, storing thereon program codes executable by a processor, wherein the program codes, when being executed by the processor, cause the processor to implement an audio processing method, comprising:

determining, based on a wireless signal transmitted from a sound source device, a spatial position parameter of a wireless earphone, wherein the spatial position parameter is used to indicate a spatial position relationship between the wireless earphone and the sound source device;

obtaining, based on the spatial position parameter, a target spatial audio parameter of the wireless earphone, wherein the target spatial audio parameter comprises an audio parameter of direct sound, an audio parameter of reflected sound, and an audio parameter of reverberation sound, the audio parameter of direct sound comprises a delay duration of direct sound, and the audio parameter of reflected sound comprises a gain parameter of reflected sound and a delay duration of reflected sound; and determining a to-be-played audio signal, based on the target spatial audio parameter and an audio signal outputted by the sound source device, comprising:

obtaining a direct sound signal, by delaying the audio signal based on the delay duration of direct sound;

setting, based on the audio parameter of reflected sound, a gain parameter and a delay parameter for each of N first all-pass filters; obtaining a reflected sound sub-signal by performing, with each of the first all-pass filters, volume adjustment and delay processing on components of the direct sound signal in a whole frequency band range; and obtaining a reflected sound signal by mixing the reflected sound sub-signals obtained by the N first all-pass filters;

obtaining, based on the audio parameter of reverberation sound, a reverberation sound signal of the audio signal; and mixing the direct sound signal, the reflected sound signal and the reverberation sound signal, and obtaining the to-be-played audio signal.

* * * * *